United States Patent
Arai

(10) Patent No.: US 9,106,898 B2
(45) Date of Patent: Aug. 11, 2015

(54) IMAGE CAPTURING APPARATUS, CONTROL METHOD THEREOF AND RECORDING MEDIUM

(75) Inventor: Tatsuya Arai, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 490 days.

(21) Appl. No.: 13/556,630

(22) Filed: Jul. 24, 2012

(65) Prior Publication Data

US 2013/0050438 A1 Feb. 28, 2013

(30) Foreign Application Priority Data

Aug. 26, 2011 (JP) .................................. 2011-185251

(51) Int. Cl.
| | | |
|---|---|---|
| *H04N 13/00* | (2006.01) | |
| *H04N 13/02* | (2006.01) | |
| *H04N 5/235* | (2006.01) | |
| *G03B 7/00* | (2014.01) | |
| *G03B 35/10* | (2006.01) | |

(52) U.S. Cl.
CPC ............ *H04N 13/0217* (2013.01); *G03B 7/006* (2013.01); *G03B 35/10* (2013.01); *H04N 13/0289* (2013.01); *H04N 13/0296* (2013.01); *H04N 13/0239* (2013.01)

(58) Field of Classification Search
USPC .......................................................... 348/49
See application file for complete search history.

(56) References Cited

U.S. PATENT DOCUMENTS

| | | | |
|---|---|---|---|
| 2007/0024741 A1* | 2/2007 | Moriya et al. | 348/363 |
| 2007/0076112 A1* | 4/2007 | Nakano et al. | 348/311 |
| 2010/0245546 A1* | 9/2010 | Kuroki | 348/49 |

FOREIGN PATENT DOCUMENTS

| | | |
|---|---|---|
| JP | 02-171738 | 7/1990 |
| JP | 06-202006 A | 7/1994 |
| JP | 08-015616 A | 1/1996 |
| JP | 2010-081580 | 4/2010 |
| JP | 2010-102230 A | 5/2010 |
| WO | 2012/002297 A1 | 1/2012 |

OTHER PUBLICATIONS

The above foreign patent documents were cited in a Jun. 5, 2015 Japanese Office Action, which is enclosed without an English Translation, that issued in Japanese Patent Application No. 2011-185251.

* cited by examiner

*Primary Examiner* — Roberto Velez
*Assistant Examiner* — Stephen Coleman
(74) *Attorney, Agent, or Firm* — Cowan, Liebowitz & Latman, P.C.

(57) ABSTRACT

An image capturing apparatus includes an image capturing unit configured to receive light beams split after passing through an aperture and output a plurality of stereopsis image data. When the object brightness falls within a predetermined range and the image capturing unit performs image capturing in which a plurality of stereopsis image data are output, the aperture is controlled to open much more than when the image capturing unit performs image capturing in which a plurality of stereopsis image data are not output at the same exposure.

10 Claims, 8 Drawing Sheets

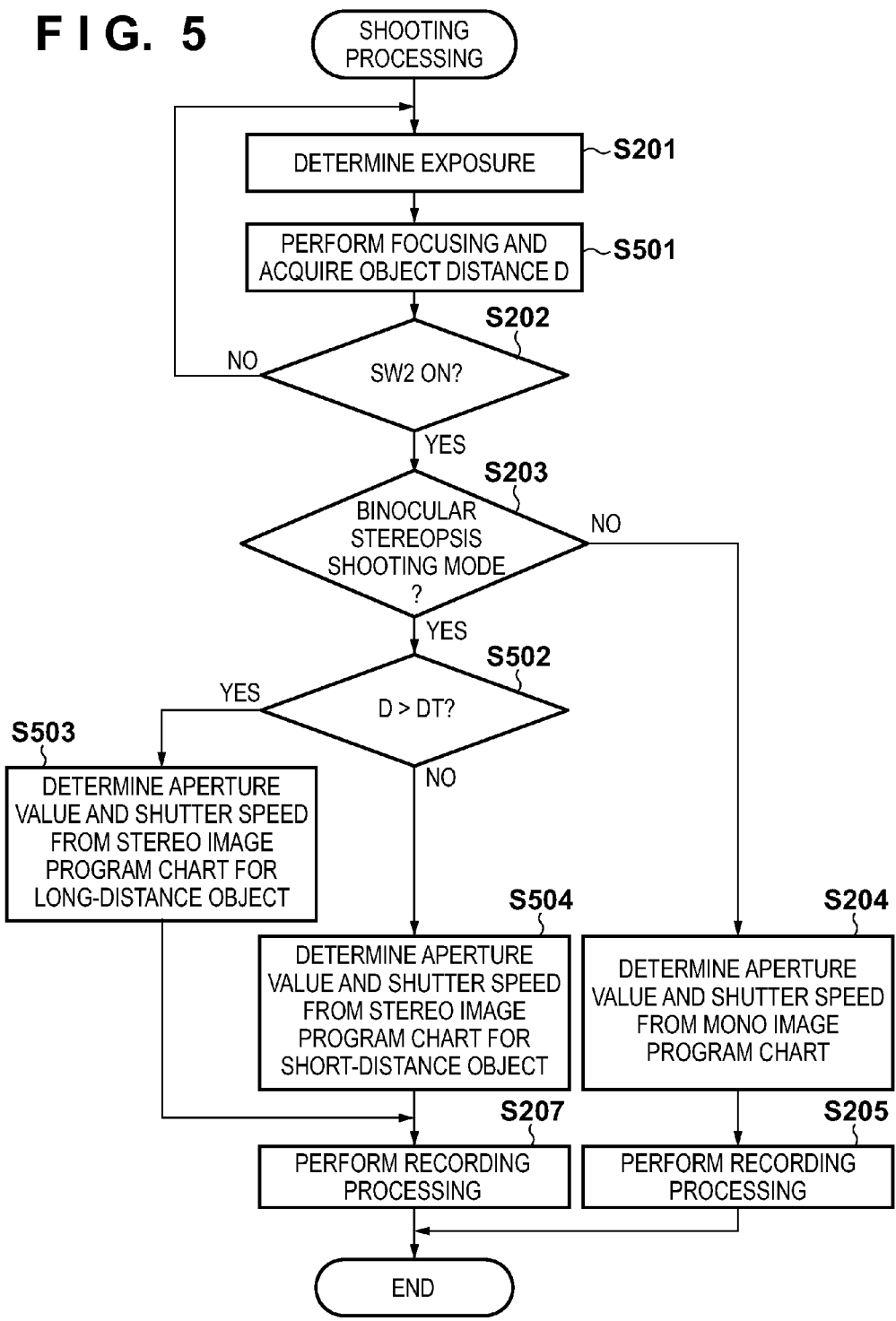

IMAGE CAPTURING APPARATUS, CONTROL METHOD THEREOF AND RECORDING MEDIUM

BACKGROUND OF THE INVENTION

1. Field of the Invention

The present invention relates to an image capturing apparatus, a control method thereof, and a recording medium and, particularly, to a technique of shooting binocular stereopsis images using one imaging optical system.

2. Description of the Related Art

Recently, image capturing apparatuses called 3D cameras capable of shooting binocular stereopsis images are commercially available, even for home use. As a method of shooting binocular stereopsis images, various methods have been proposed. The home 3D camera often employs a system in which two imaging optical systems are arranged at a predetermined base-line length, and left- and right-eye images are shot using the respective imaging optical systems.

As another system, binocular stereopsis images are shot using only one imaging optical system (monocular). For example, Japanese Patent Laid-Open No. 2010-81580 discloses an image capturing apparatus which acquires binocular stereopsis images by splitting a light beam which has passed through an imaging optical system into left- and right-eye light beams using a spectral mirror, and forming images from the respective light beams on separate image sensors.

In most cases, 3D cameras capable of shooting binocular stereopsis images can shoot not only binocular stereopsis images (stereo images) but also normal images (mono images).

Generally when shooting a mono image, photometry in a shooting environment is performed before shooting for recording to determine an exposure suited to photometry in the shooting environment. The shutter speed and aperture value are determined based on the exposure, and then shooting for recording is executed. For example, in shooting in a shooting environment where the brightness is high because of fine weather or the like, a sufficient light quantity can be ensured. The suppression of the light quantity of an optical image to be formed on the image sensor is therefore controlled by increasing the shutter speed (shortening the exposure time) or increasing the aperture value. Under this exposure control, an image can be shot at the correct exposure while preventing loss in highlight detail of the object.

Even when shooting stereo images, exposure control is considered to be performed similarly to the shooting of mono images. However, when shooting stereo images with a monocular 3D camera, the exposure control may cause the following problem.

When shooting binocular stereopsis images using one imaging optical system as in the image capturing apparatus disclosed in Japanese Patent Laid-Open No. 2010-81580, left- and right-eye image sensors receive light beams which have been split by the spectral mirror and which have passed through different regions of the incident pupil of the imaging optical system. For example, as shown in FIG. 7A, the spectral mirror is configured so that light beams which have passed through regions divided by a perpendicular passing through the center of the incident pupil reach the respective image sensors. In this case, optical images formed on the respective light-receiving elements are images which have passed through rectangular regions 701 and 702, as shown in FIG. 7B. At this time, the centers of gravity of the rectangular regions serve as the optical axes of the left- and right-eye images. Thus, the left- and right-eye images are equivalent to left- and right-eye images acquired by an image capturing apparatus including two imaging optical systems which are arranged using the distance between the centers of gravity (radius r of the incident pupil) as a base-line length.

Note that the incident pupil of the imaging optical system changes depending on the aperture opening. As the aperture decreases by exposure control, the distance between the centers of gravity of obtained left- and right-eye images also decreases. When the distance between the centers of gravity, that is, the base-line length decreases, a stereoscopic effect given to the observer when the left- and right-eye images are displayed on a display device capable of binocular stereopsis becomes weak.

For example, FIG. 8B shows left- and right-eye images obtained by shooting objects A and B (distance between object A and the image capturing apparatus>distance between object B and the image capturing apparatus) when the base-line length is r, as shown in FIG. 8A. At this time, if neither object A nor B exists on a plane on which the gaze points of two imaging optical systems exist, disparities corresponding to shift amounts between the images are generated as shown in FIG. 8B. FIG. 8D shows left- and right-eye images obtained by shooting objects A and B when r is r', which is smaller than the base-line length, as shown in FIG. 8C. At this time, the base-line length is shorter than that in FIG. 8A, and disparities generated for the respective objects become small.

A human perceives the degrees of pop out or depth perception in stereoscopy depending on the magnitude of a disparity serving as a shift between images formed on the left- and right-eye retinas. As the disparity decreases, the stereoscopic effect of binocular stereopsis images weakens. That is, if exposure control is performed in the same way as that for mono images, the stereoscopic effect of stereo images on the observer may weaken depending on the aperture.

SUMMARY OF THE INVENTION

The present invention has been made to solve the conventional problems. The present invention provides suppressing a decrease in the disparity between binocular stereopsis images and acquiring binocular stereopsis images which allow the observer to perceive an appropriate stereoscopic effect.

According to one aspect of the present invention, there is provided an image capturing apparatus comprising: an image capturing unit configured to receive light beams split after passing through an aperture and output a plurality of stereopsis image data; and a control unit configured to control the aperture, wherein when an object brightness falls within a predetermined range and the image capturing unit performs image capturing in which the plurality of stereopsis image data are output, the control unit controls to open the aperture much more than when the image capturing unit performs image capturing in which the plurality of stereopsis image data are not output at the same exposure.

According to another aspect of the present invention, there is provided a method of controlling an image capturing apparatus including an image capturing unit configured to receive light beams split after passing through an aperture and output a plurality of stereopsis image data, comprising: when an object brightness falls within a predetermined range and the image capturing unit performs image capturing in which the plurality of stereopsis image data are output, controlling to open the aperture much more than when the image capturing unit performs image capturing in which the plurality of stereopsis image data are not output at the same exposure.

Further features of the present invention will become apparent from the following description of exemplary embodiments (with reference to the attached drawings).

BRIEF DESCRIPTION OF THE DRAWINGS

FIG. 5 is a flowchart exemplifying shooting processing according to the second embodiment of the present invention;

DESCRIPTION OF THE EMBODIMENTS

First Embodiment

Figure 1:
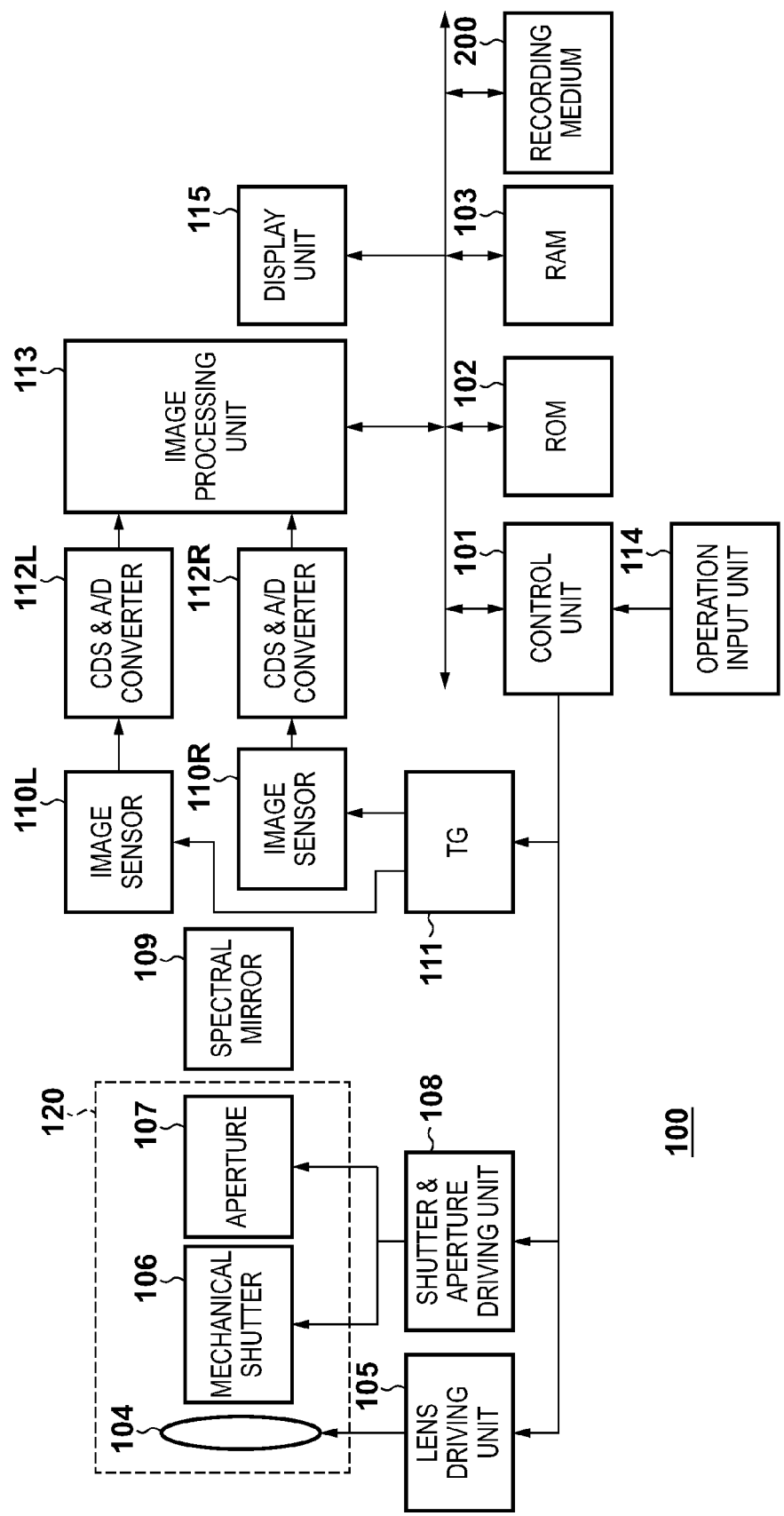
FIG. 1 is a block diagram showing the functional arrangement of a digital camera according to an embodiment of the present invention.

An exemplary embodiment of the present invention will now be described in detail with reference to the accompanying drawings. Note that the following embodiment will explain an example in which the present invention is applied to a digital camera that includes a spectral mirror and two image sensors, and that can shoot binocular stereopsis images using split light beams having passed through different regions of the incident pupil of one imaging optical system. However, the present invention is applicable to an arbitrary device which includes one imaging optical system and can shoot binocular stereopsis images by receiving light beams having passed through different regions of the incident pupil of the imaging optical system.

In this specification, the respective blocks of a digital camera 100 are denoted by reference numerals and will be described below. For example, a reference numeral with a suffix "L" or "R" individually denotes a block arranged for the left or right eye, such as an image sensor. Reference numerals for blocks arranged for the left and right eyes without adding "L" and "R" denote both of the left- and right-eye blocks, unless otherwise specified.

(Functional Arrangement of Digital Camera 100)

FIG. 1 is a block diagram showing the functional arrangement of the digital camera 100 according to an embodiment of the present invention.

A control unit 101 is, for example, a CPU, and controls the operations of the respective blocks of the digital camera 100. More specifically, the control unit 101 reads out a shooting processing program (to be described later) stored in a ROM 102, expands it in a RAM 103, and executes it to control the operations of the respective blocks.

The ROM 102 is, for example, a rewritable nonvolatile memory, and stores parameters necessary for the operations of the respective blocks of the digital camera 100, the set values of the digital camera 100 that have been set by the user, and the like, in addition to the shooting processing program. The embodiment assumes that the ROM 102 stores shooting mode information which is set in the digital camera 100 and which is used to determine whether to shoot binocular stereopsis images. Also, assume that the ROM 102 stores in advance a program chart representing a combination of an aperture value Av and shutter speed (time value) Tv set for an exposure Ev determined in shooting.

The RAM 103 is, for example, a volatile memory, and is used not only as a shooting processing program expansion area but also a temporary storage area for intermediate data and the like output in the operations of the respective blocks of the digital camera 100.

An imaging optical system 120 includes at least an imaging lens 104 and aperture 107, and in the embodiment, further includes a mechanical shutter 106. Note that the imaging optical system 120 may not be incorporated in the digital camera 100 and may be detachable from the digital camera 100. The imaging lens 104 is a lens unit including an objective lens, focus lens, and the like. A lens driving unit 105 drives the imaging lens 104 to form optical images on image sensors 110. The mechanical shutter 106 is an optical member which physically blocks the optical path of a light beam which has passed through the imaging lens 104. A shutter & aperture driving unit 108 drives the mechanical shutter 106 to transmit a light beam for only an exposure time defined by a set shutter speed. The aperture 107 is a mechanical optical member such as an iris aperture. The shutter & aperture driving unit 108 changes the opening to physically limit the quantity of a light beam passing through the optical member.

Figure 7A:
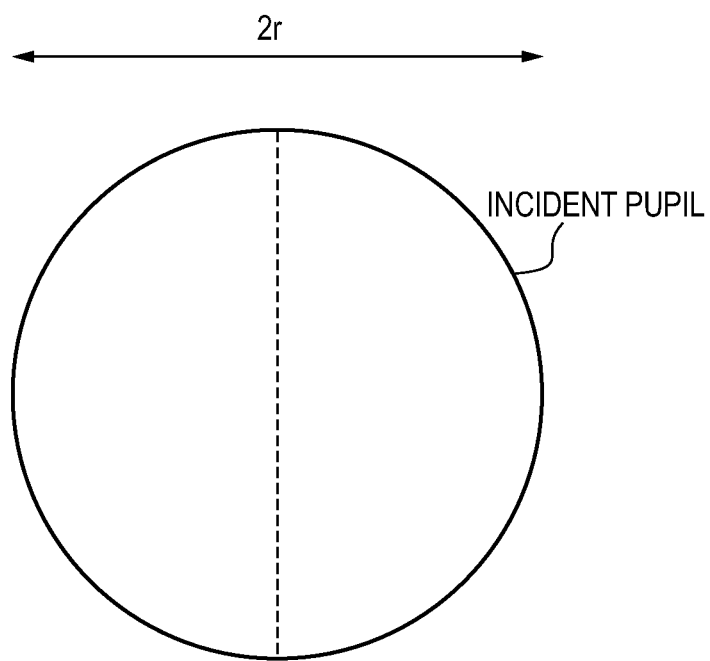
FIGS. 7A and 7B are views for explaining light beams used to generate left- and right-eye images when shooting binocular stereopsis images using one imaging optical system.
Figure 7B:
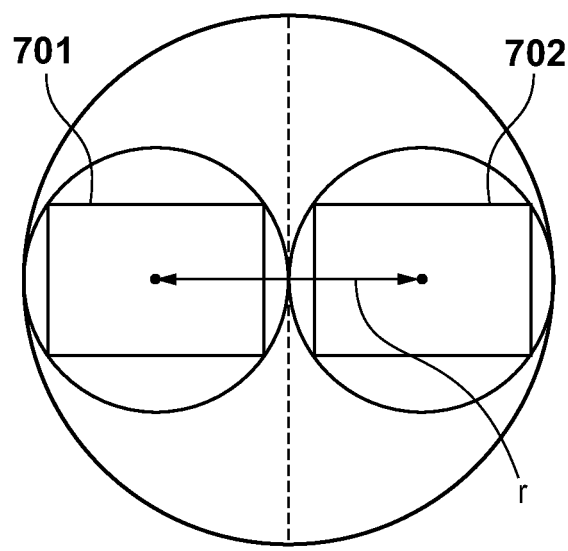
Figure 8A:
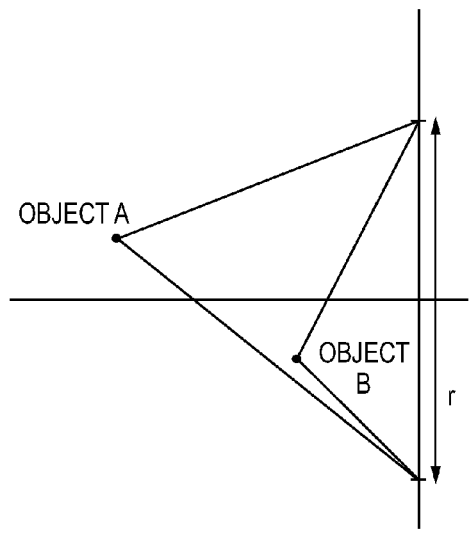
FIGS. 8A, 8B, 8C, and 8D are views for explaining a disparity which changes depending on the aperture when shooting binocular stereopsis images using one imaging optical system.
Figure 8C:
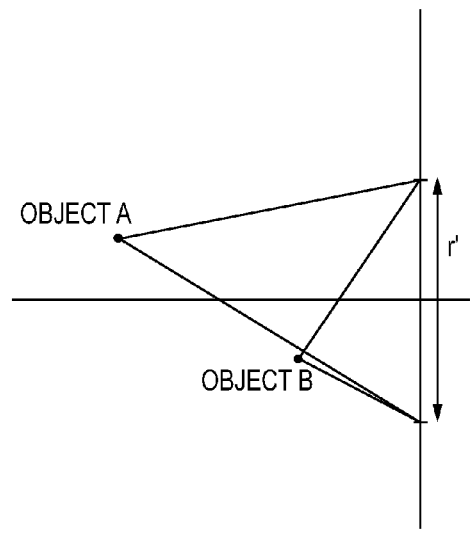
Figure 8B:
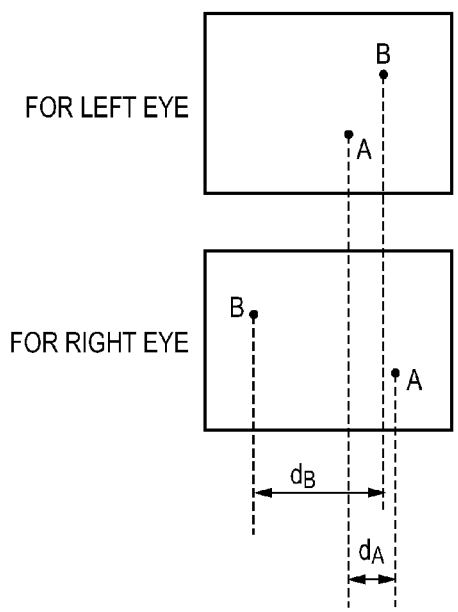
Figure 8D:
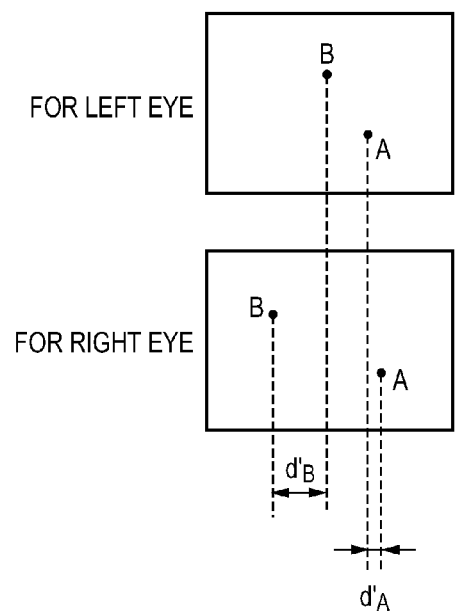

A spectral mirror 109 is a mirror unit which splits a light beam having passed through the incident pupil of the imaging optical system 120 into two light beams in the horizontal direction, as shown in FIGS. 7A and 7B, and causes the respective light beams to form images on the image sensors 110L and 110R.

Each image sensor 110 is an optical element such as a CCD sensor or CMOS sensor. The image sensor 110 photoelectrically converts an optical image which is formed on the image sensor surface via the imaging optical system 120 and spectral mirror 109, and outputs an analog image signal to a corresponding CDS & A/D converter 112 (to be described later). The image sensor 110 performs photoelectric conversion and output of an analog image signal in accordance with a driving pulse generated by a TG 111 under the control of the control unit 101.

In the embodiment, when shooting a normal mono image, an analog image signal obtained by either the image sensor 110L or 110R is used, but another method may be adopted. Shooting of stereo images can be implemented using even an image sensor in which one pixel includes two left- and right-eye light-receiving elements, and respective light-receiving elements receive light beams which have passed through different regions of the incident pupil via microlenses arranged for respective pixels without using the spectral mirror 109.

Each CDS & A/D converter 112 is a signal processing circuit which executes processes such as correlated double sampling, gain adjustment, and A/D conversion for an input analog image signal. The CDS & A/D converter 112 outputs the obtained image data to an image processing unit 113.

The image processing unit 113 performs various correction processes such as noise reduction processing, shading processing, and white balance adjustment processing for input image data, and performs encoding processing into a predetermined recording format.

An operation input unit 114 is the user interface of the digital camera 100, including a power button and release button. The operation input unit 114 analyzes an operation by the user, and transmits a control signal corresponding to the operation to the control unit 101.

A display unit 115 is the display device of the digital camera 100, such as a compact LCD. The display unit 115 displays image data obtained by shooting for recording, or image data read out from a recording medium 200 (to be described later). The display unit 115 functions as an electronic viewfinder by displaying analog image signals successively output from the image sensor 110 at any time. In the embodiment, the digital camera 100 can shoot binocular stereopsis images, so the display unit 115 may be a display device configured to implement autostereopsis for the user.

The recording medium 200 is a recording device detachably connected to the digital camera 100, such as the built-in memory of the digital camera 100, a memory card, or an HDD. The recording medium 200 records binocular stereopsis image data obtained by shooting processing (to be described later) after converting the image data into an image file of a predetermined recording format by the image processing unit 113.

(Shooting Processing)

Figure 2:
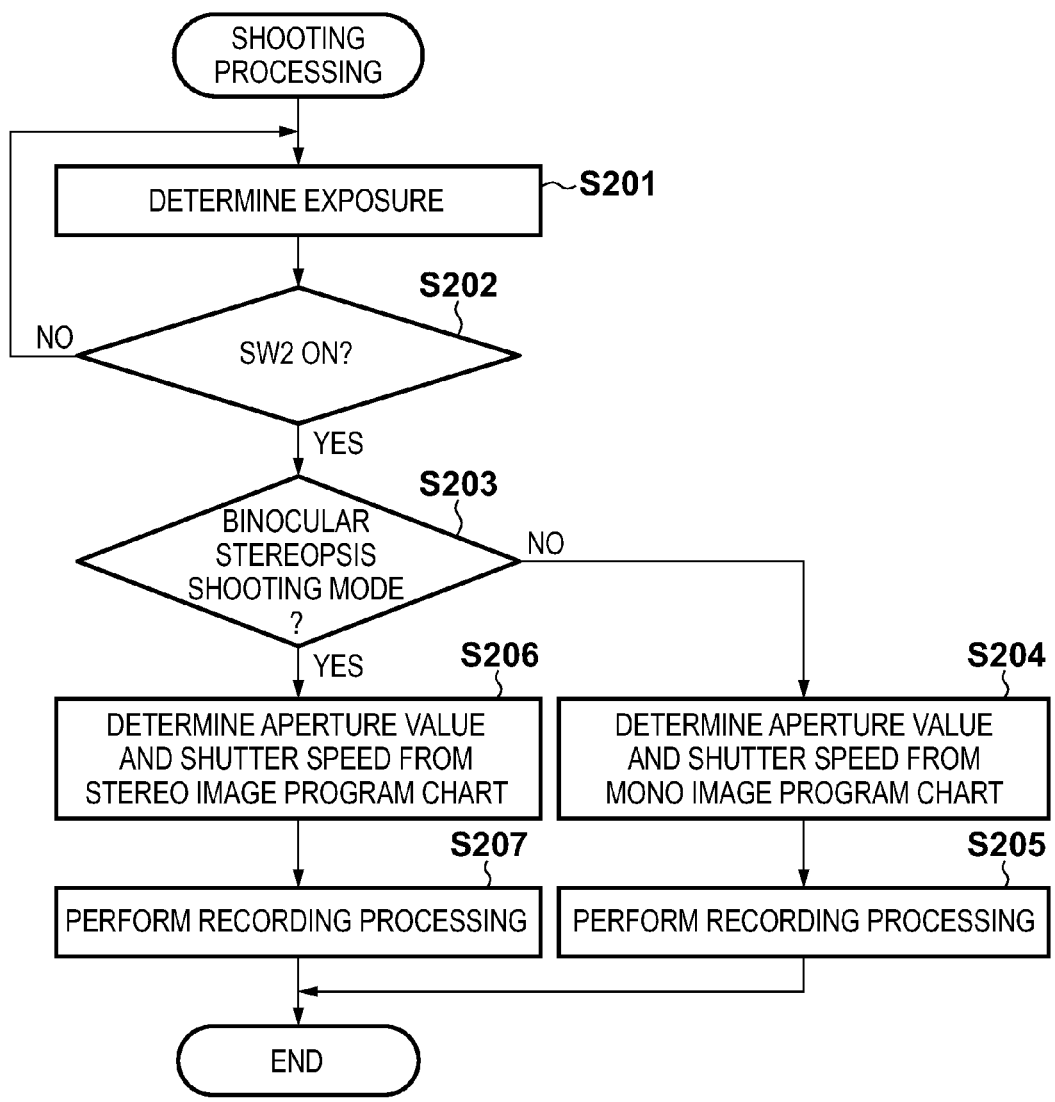
FIG. 2 is a flowchart exemplifying shooting processing according to the first embodiment of the present invention.

Shooting processing by the digital camera 100 according to the embodiment having the above arrangement will be explained in detail with reference to the flowchart of FIG. 2. Processing corresponding to this flowchart can be implemented by, for example, reading out a corresponding processing program stored in the ROM 102, expanding it in the RAM 103, and executing it by the control unit 101. In the following description, shooting processing starts when, for example, the user presses the release button (not shown) halfway and the control unit 101 receives a SW1 signal from the operation input unit 114 to start a shooting preparation operation.

In step S201, the control unit 101 determines an exposure (Ev value) suited to the current shooting environment by performing TTL photometry using image data which is obtained by sensing an image by the image sensor 110R and is stored in the RAM 103. In step S202, the control unit 101 determines whether it has received a SW2 signal which is output from the operation input unit 114 when the user presses the release button fully, and corresponds to a shooting instruction for recording. If the control unit 101 determines that it has received the SW2 signal, the process shifts to step S203. If the control unit 101 determines that it has not received the SW2 signal, the process returns to step S201. Although not shown in the flowchart of shooting processing, if the user cancels the release button operation and the control unit 101 does not receive the SW1 signal from the operation input unit 114 any more, the control unit 101 ends the shooting processing.

In step S203, the control unit 101 determines whether the currently set shooting mode of the digital camera 100 is a mode in which binocular stereopsis images are shot. More specifically, the control unit 101 reads out shooting mode information stored in the ROM 102, and determines whether a shooting mode in which binocular stereopsis images are shot is set. If the control unit 101 determines that the currently set shooting mode of the digital camera 100 is a mode in which binocular stereopsis images are shot, the process shifts to step S206. If the control unit 101 determines that the currently set shooting mode of the digital camera 100 is another mode, the process shifts to step S204.

In step S204, the control unit 101 reads out, from the ROM 102, a program chart which is associated with normal mono image shooting and represents the relationship between the exposure, the aperture value, and the shutter value. The control unit 101 then acquires a combination of an aperture value and shutter speed (exposure time) corresponding to the exposure determined in step S201.

Figure 3A:
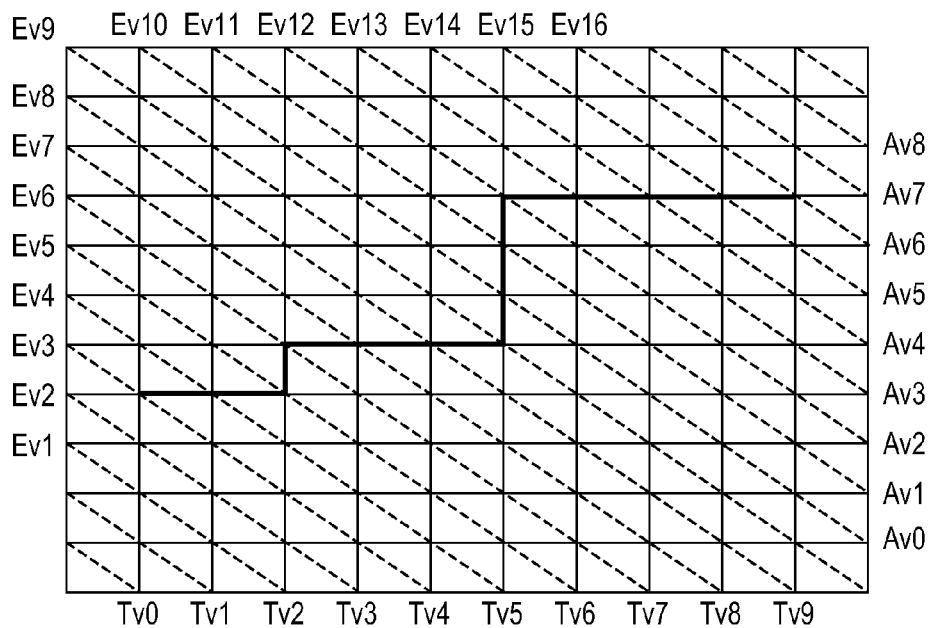
FIGS. 3A and 3B are views exemplifying program charts which are used when shooting a mono image and stereo images, and represent the relationship between the exposure, the aperture value, and the shutter speed according to the first embodiment of the present invention.

For example, the program chart associated with normal shooting is set as shown in FIG. 3A. In normal shooting, when the exposure is small (Ev3 to Ev5), that is, when the brightness of the shooting environment is low, the aperture value is set to Av3 on the full-open side, and the shutter speed is set to Tv0 to Tv2 on the low-speed side in order to ensure the light quantity of an object. When the exposure is large (Ev12 to Ev16), that is, the brightness of the shooting environment is high, the aperture value is set to Av7 (small aperture) on the small-aperture side, and the shutter speed is set to Tv5 to Tv9 on the high-speed side in order to prevent a blown-out highlight of the object. As shown in FIG. 3A, in normal shooting, as the brightness of the shooting environment increases, the aperture value is set closer to the small-aperture side stepwise.

In step S205, the control unit 101 executes a shooting operation for recording using the combination of the aperture value and shutter speed that has been acquired from the program chart in step S204. The control unit 101 controls the image processing unit 113 to convert the obtained image data into a predetermined recording format. The control unit 101 records the converted image data on the recording medium 200, completing the processing.

If the currently set shooting mode of the digital camera 100 is a mode in which binocular stereopsis images are shot, the control unit 101 performs the following processing. In step S206, the control unit 101 reads out, from the ROM 102, a program chart which is associated with binocular stereopsis shooting and represents the relationship between the exposure, the aperture value, and the shutter value. The control unit 101 then acquires a combination of an aperture value and shutter speed corresponding to the exposure determined in step S201.

Figure 3B:
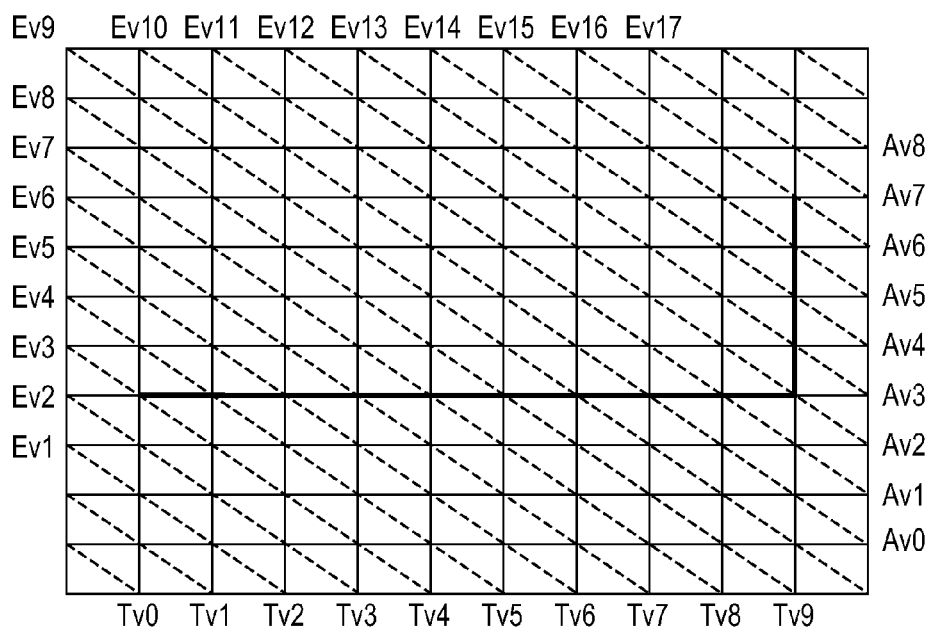

As described above, in shooting binocular stereopsis images, as the aperture value decreases, an image shift between obtained left- and right-eye images for a single object decreases, and the stereoscopic effect perceived by the observer weakens. To prevent this, in the embodiment, the program chart associated with binocular stereopsis shooting is set as shown in FIG. 3B. In shooting binocular stereopsis images, when the brightness of an object falls within a predetermined range (exposure range of Ev6 to Ev11), the shutter speed is set higher and the aperture value is set closer to the full-open side, compared to normal shooting under the same exposure condition. With these settings, the aperture can be controlled to be closer to the full-open side, compared to shooting a mono image under the same exposure condition. Hence, binocular stereopsis images which do not impair the stereoscopic effect can be acquired.

In step S207, the control unit 101 executes a shooting operation for recording using the combination of the aperture value and shutter speed that has been acquired from the program chart in step S206. The control unit 101 controls the image processing unit 113 to convert the obtained left- and right-eye image data (plurality of stereopsis image data) into a predetermined recording format. The control unit 101 records the converted image data on the recording medium 200, completing the processing.

As described above, the image capturing apparatus according to the present invention can suppress a decrease in the disparity between binocular stereopsis images and acquire binocular stereopsis images which allow the observer to perceive an appropriate stereoscopic effect. More specifically, the image capturing apparatus includes one imaging optical system and image sensors which receive a light beam that has passed through the imaging optical system sense one image as a mono image, or left- and right-eye images as stereo images, and outputs the image or images. When capturing and outputting left- and right-eye images from a light beam which has passed through one imaging optical system, the aperture is controlled to be closer to the full-open side, compared to shooting one image at the same exposure.

Modification

The first embodiment has described a method of setting the aperture closer to the full-open side, compared to shooting a mono image under the same exposure condition as long as the shutter speed can be set high. The modification will explain a case in which the light quantity is controlled using an ND filter which attenuates a light beam to be received by the image sensor 110, without changing the aperture opening or increasing the shutter speed.

In the digital camera 100 according to the modification, the imaging optical system 120 includes a built-in ND filter (not shown) capable of controlling whether to apply the ND filter, in order to attenuate a light beam to be received by the image sensor 110. The built-in ND filter is set to apply the filter within an exposure range of, for example, Ev13 to Ev15, and controls the light quantity.

Figure 4A:
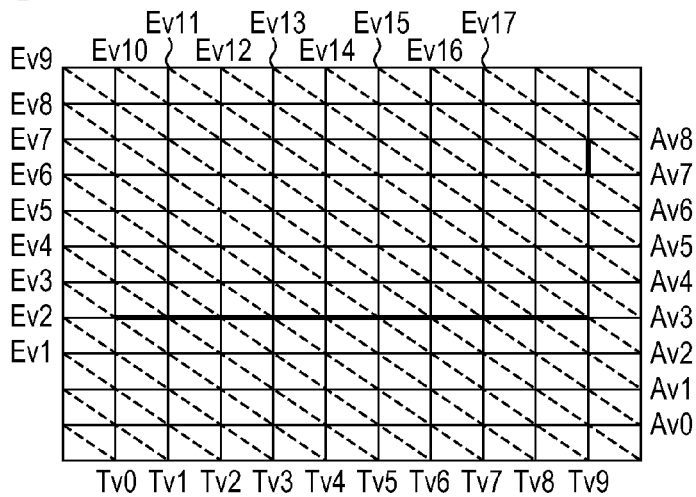
FIGS. 4A, 4B, and 4C are views exemplifying program charts which are used when shooting stereo images, and represent the relationship between the exposure, the aperture value, and the shutter speed according to the second and third embodiments and modification of the present invention.

FIG. 4A shows a program chart used to determine an aperture value and shutter speed when shooting binocular stereopsis images in the modification. As is apparent from FIG. 4A, the program chart represents the same combinations as those in the program chart used when shooting binocular stereopsis images in the first embodiment, except for a range of Ev12 to Ev16.

When the currently set shooting mode of the digital camera 100 is a mode in which binocular stereopsis images are shot, the control unit 101 suffices to perform, for example, the following processing after determining an exposure suited to the current shooting environment. When the determined exposure falls within the exposure range (Ev12 to Ev16) set for shooting by applying the ND filter, the control unit 101 sets a combination corresponding to Ev12 in the program chart as a combination of the aperture value and shutter speed for shooting for recording. Thereafter, the control unit 101 drives a predetermined driving system of the imaging optical system 120 to apply the built-in ND filter, and performs shooting.

With these settings, similar to the above-described embodiment, the aperture can be controlled to be closer to the full-open side, compared to shooting a mono image under the same exposure condition. That is, binocular stereopsis images which do not impair the stereoscopic effect can be acquired in an exposure range wider than a range where the shutter speed can be set high.

Second Embodiment

In the first embodiment and modification, when shooting binocular stereopsis images, shooting is performed by controlling the aperture to be closer to the full-open side based on an exposure determined in accordance with a shooting environment, compared to shooting a mono image under the same exposure condition. However, an image shift between binocular stereopsis images for a single object changes depending on the object distance, as described above. Binocular stereopsis images obtained by shooting using an aperture value closer to the full-open side do not always allow the observer to perceive an appropriate stereoscopic effect. As the distance of an object to the digital camera 100 is shorter, the observer can perceive the object as if the object popped up more greatly when the object is displayed stereoscopically. However, since the image shift between the binocular stereopsis images is large, the observer may get tired in the process of viewing. The second embodiment will describe an example in which binocular stereopsis images which allow the observer to perceive an appropriate stereoscopic effect are acquired by changing, based on information of the distance between an object contained in the shooting environment and a digital camera 100, the program chart used to shoot binocular stereopsis images.

(Shooting Processing)

Shooting processing by the digital camera 100 according to the second embodiment having the same arrangement as that in the first embodiment will be explained in detail with reference to the flowchart of FIG. 5. Processing corresponding to this flowchart can be implemented by, for example, reading out a corresponding processing program stored in a ROM 102, expanding it in a RAM 103, and executing it by a control unit 101. In the following description, shooting processing starts when, for example, the user presses a release button (not shown) halfway, and the control unit 101 receives a SW1 signal from an operation input unit 114 to start a shooting preparation operation. Of processes performed in the respective steps of shooting processing according to the second embodiment, steps in which the same processes as those in shooting processing according to the first embodiment are performed are denoted by the same reference numerals, and a description thereof will not be repeated. Only steps in which characteristic processes in the second embodiment are performed will be explained.

In step S501, the control unit 101 performs an AF operation according to a phase-difference detection method, and controls an imaging optical system 120 to focus on an object. In addition, the control unit 101 acquires information about the distance D between the object and the digital camera 100 that has been obtained by the AF operation. In the second embodiment, the distance between the object and the digital camera 100 is acquired as the result of the AF operation. However, it will readily occur that the distance between the object and the digital camera 100 may be measured by another method.

If the control unit 101 determines step S203 that the currently set shooting mode of the digital camera 100 is a mode in which binocular stereopsis images are shot, it determines in step S502 whether the distance D between the object and the digital camera 100 is larger than a predetermined threshold DT. More specifically, the control unit 101 reads out information of the threshold DT stored in, for example, the ROM 102, and compares, with the threshold DT, the distance D between the object and the digital camera 100 based on the information acquired in step S501. If the control unit 101 determines that the distance D between the object and the digital camera 100 is larger than the threshold DT, the process shifts to step S503. If the control unit 101 determines that the distance D is equal to or smaller than the threshold DT, the process shifts to step S504.

In step S503, the control unit 101 reads out, from the ROM 102, a long-distance object program chart out of program charts associated with binocular stereopsis shooting. The control unit 101 acquires a combination of an aperture value and shutter speed corresponding to the exposure determined in step S201. The second embodiment assumes that the long-distance object program chart is the same as the program chart associated with binocular stereopsis shooting in the first embodiment.

Figure 4B:
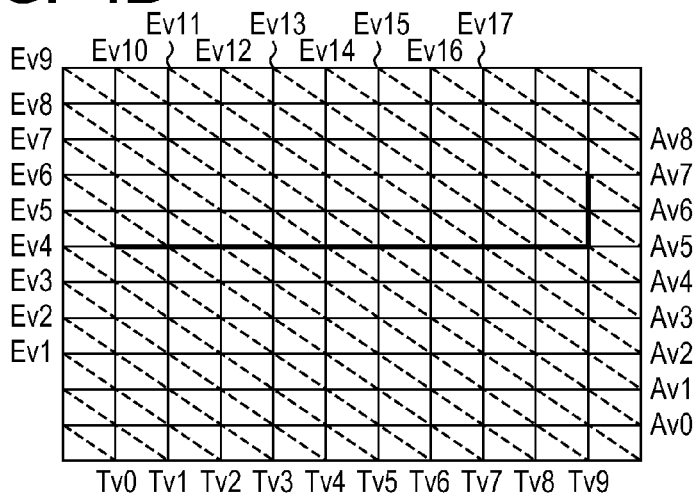

If the distance D between the object and the digital camera 100 is equal to or smaller than the threshold DT, the control unit 101 performs the following processing. In step S504, the control unit 101 reads out, from the ROM 102, a short-distance object program chart out of program charts associated with binocular stereopsis shooting. The control unit 101 acquires a combination of an aperture value and shutter speed corresponding to the exposure determined in step S201. The short-distance object program chart is set as shown in FIG. 4B. The aperture is set closer to the small-aperture side, compared to the long-distance object program chart (FIG. 3B). In the short-distance object program chart, for example, in a relatively large exposure range of Ev10 to Ev15, the aperture is set closer to the full-open side, compared to normal mono image shooting.

In the second embodiment, the threshold is set, and a suitable program chart is selected from two types of program charts in accordance with the distance between the object and the digital camera 100, and a combination of an aperture value and shutter speed is determined. However, the practice of the present invention is not limited to this. It suffices to control the aperture to be set closer to the full-open side as the distance between the object and the digital camera 100 becomes larger, and to closer to the small-aperture side as the distance becomes smaller. For example, three or more program charts may be set. A function using the distance between the object and the digital camera 100 and the exposure as variables may be set in advance to determine an aperture value based on the function.

Third Embodiment

The first and second embodiments and the modification have described aperture control in still image shooting. The third embodiment will describe aperture opening control when performing binocular stereopsis moving image shooting by successively shooting left- and right-eye images.

Generally, still image shooting uses a mechanical shutter 106 in an imaging optical system 120 to control the light quantity by light shielding and perform shooting. To the contrary, moving image shooting uses not the mechanical shutter 106 but a so-called electronic shutter to perform electrical ON/OFF control of an image sensor 110. When the electronic shutter is used, the shutter speed can be increased much more than that when the mechanical shutter 106 is used. Shooting can be executed with an aperture set closer to the full-open side in a wider exposure range than in still image shooting.

(Shooting Processing)

Figure 6:
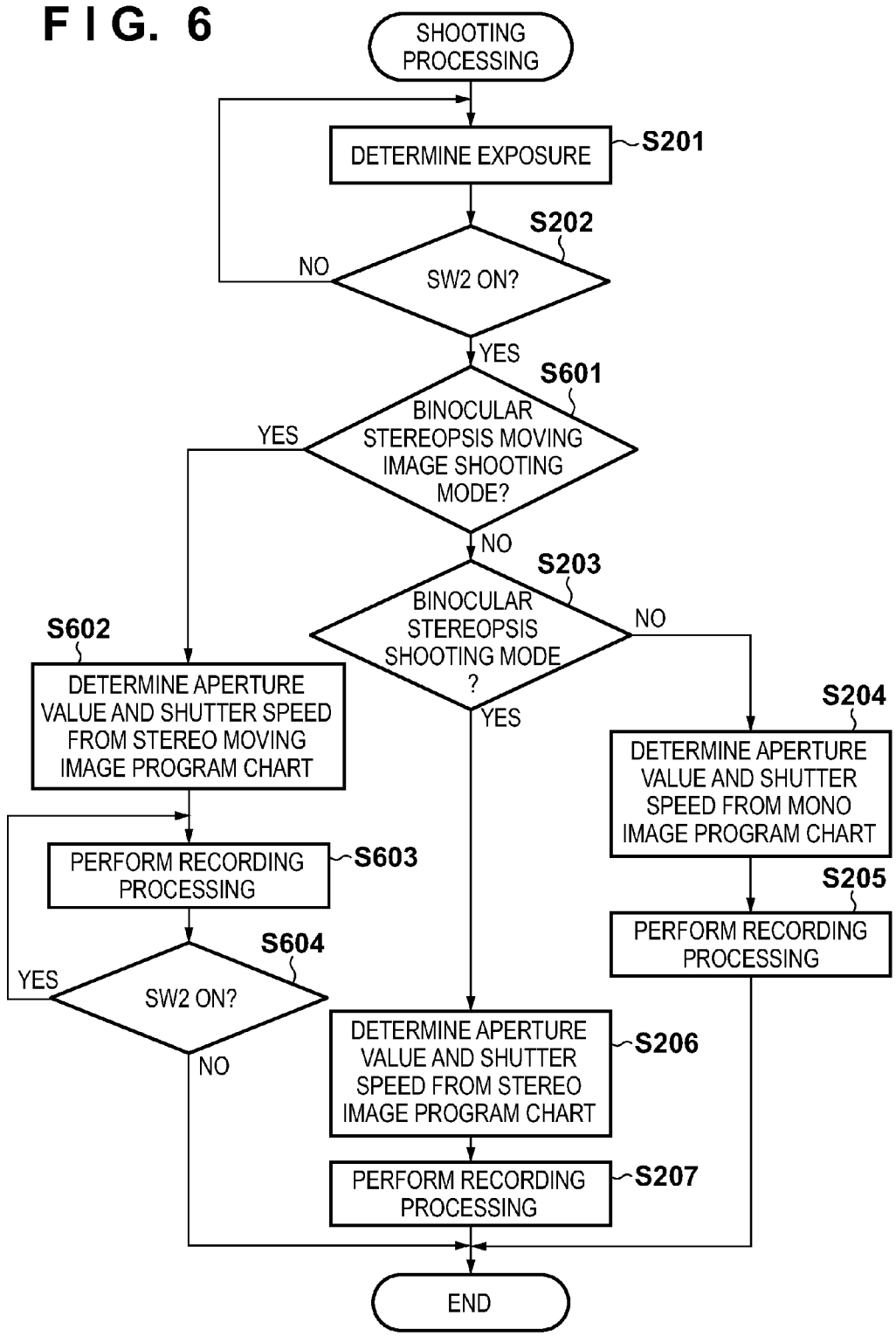
FIG. 6 is a flowchart exemplifying shooting processing according to the third embodiment of the present invention.

Shooting processing by a digital camera 100 according to the third embodiment having the same arrangement as that in the first embodiment will be explained in detail with reference to the flowchart of FIG. 6. Processing corresponding to this flowchart can be implemented by, for example, reading out a corresponding processing program stored in a ROM 102, expanding it in a RAM 103, and executing it by a control unit 101. In the following description, shooting processing starts when, for example, the user presses a release button (not shown) halfway, and the control unit 101 receives a SW1 signal from an operation input unit 114 to start a shooting preparation operation. Of processes performed in the respective steps of shooting processing according to the third embodiment, steps in which the same processes as those in shooting processing according to the first embodiment are performed are denoted by the same reference numerals, and a description thereof will not be repeated. Only steps in which characteristic processes in the third embodiment are performed will be explained.

In step S601, the control unit 101 determines whether the currently set shooting mode of the digital camera 100 is a mode in which binocular stereopsis moving images are shot. More specifically, the control unit 101 reads out shooting mode information stored in the ROM 102, and determines whether a shooting mode in which binocular stereopsis moving images are shot is set. If the control unit 101 determines that the currently set shooting mode of the digital camera 100 is a mode in which binocular stereopsis moving images are shot, the process shifts to step S602. If the control unit 101 determines that the currently set shooting mode of the digital camera 100 is another mode, the process shifts to step S203.

Figure 4C:
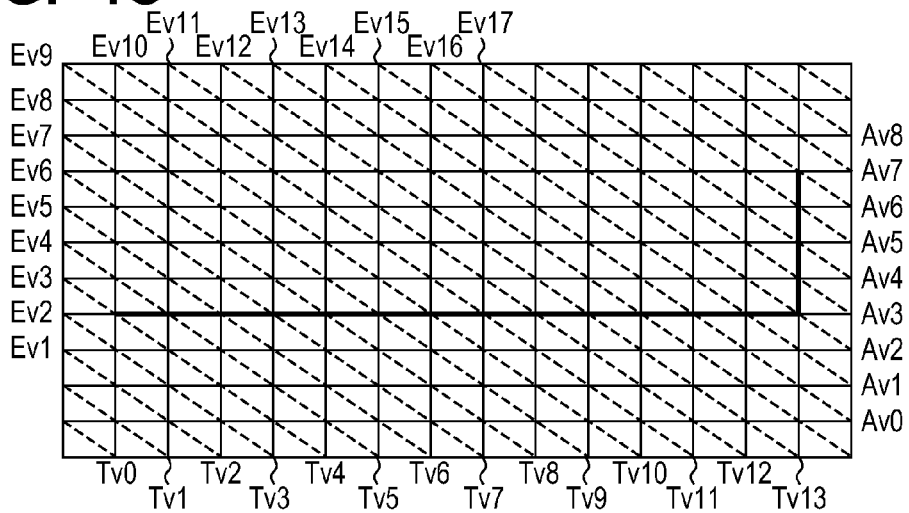

In step S602, the control unit 101 reads out, from the ROM 102, a program chart which is associated with binocular stereopsis moving image shooting and represents the relationship between the exposure, the aperture value, and the shutter value. The control unit 101 acquires a combination of an aperture value and shutter speed corresponding to the exposure determined in step S201. The program chart associated with binocular stereopsis moving image shooting is set as shown in FIG. 4C. Compared to still image shooting, higher shutter speeds (Tv10 to Tv13) can be set. Compared to shooting left- and right-eye still images, the aperture can be set closer to the full-open side even in a range of larger exposures (Ev12 to Ev16).

Although not described in the embodiment, the digital camera 100 may have not only a mode in which binocular stereopsis moving images are shot, but also a mode in which a normal mono moving image is shot. In this arrangement, when shooting binocular stereopsis moving images, similar to still image shooting, the aperture is controlled to be set closer to the full-open side, compared to shooting one moving image at the same exposure.

In step S603, the control unit 101 controls the image sensor 110 to execute shooting regarding one frame of moving image shooting in the combination of the aperture value and shutter speed acquired in step S602. The control unit 101 controls an image processing unit 113 to convert the obtained left- and right-eye image data into a predetermined format. The control unit 101 records the converted image data on a recording medium 200. In step S604, the control unit 101 determines whether it has received, from an operation input unit 114, a SW2 signal serving as a moving image shooting instruction. If the control unit 101 determines that it has received the SW2 signal, the process returns to step S603 to perform shooting regarding the next frame, and record the left- and right-eye images of this frame. If the control unit 101 determines that it has not received the SW2 signal, it performs predetermined processing for the moving image frames recorded on the recording medium 200 to convert them into one moving image file, completing processing.

The exemplary practice of the present invention has been described using the first to third embodiments and the modification. However, it will readily occur that the aperture control processes described in the respective embodiments and modification can be combined and executed. For example, when shooting binocular stereopsis moving images using the imaging optical system 120 including a built-in ND filter, the exposure range in which the aperture can be set on the full-open side can be widened much more than the range shown in FIG. 4C. When the distance between the object and the digital camera 100 changes in moving image shooting, aperture control may be performed using a program chart obtained by combining the program charts shown in FIGS. 4B and 4C.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-185251, filed Aug. 26, 2011, which is hereby incorporated by reference herein in its entirety.

What is claimed is:

1. An image capturing apparatus comprising:
   at least one image sensor configured to receive light beams split after passing through an aperture and output a plurality of stereopsis images; and
   at least one processor or one circuit; and
   a memory which is coupled to said at least one processor or one circuit and stores an instruction which cause said at least one processor or one circuit to perform,
   when an object brightness falls within a predetermined range and said at least one image sensor performs image capturing in which the plurality of stereopsis images are output, an operation in which an opening of the aperture is controlled to be closer to full-open side, compared to when said at least one image sensor performs image capturing in which the plurality of stereopsis images are not output at the same exposure.

2. The apparatus according to claim 1, wherein the memory further stores an instruction which cause said at least one processor or one circuit to perform, when the object brightness does not fall within the predetermined range and said at least one image sensor performs image capturing in which the plurality of stereopsis images are output, an operation in which an opening of the aperture is controlled to be equal to an opening of the aperture used when said at least one image sensor performs image capturing in which the plurality of stereopsis images are not output at the same exposure.

3. The apparatus according to claim 1, wherein the memory further stores an instruction which cause said at least one processor or one circuit to perform, when the object brightness falls within the predetermined range and said at least one image sensor performs image capturing in which the plurality of stereopsis images output, an operation in which an exposure time is controlled to be shortened much more than when said at least one image sensor performs image capturing in which the plurality of stereopsis images are not output at the same exposure.

4. The apparatus according to claim 1, further comprising an optical filter configured to attenuate a quantity of light to be received by said at least one image sensor,
   wherein the memory further stores an instruction which cause said at least one processor or one circuit to perform, when the object brightness falls within the predetermined range and said at least one image sensor performs image capturing in which the plurality of stereopsis images are output, an operation in which an opening of the aperture is controlled to be closer to the full-open side by an amount corresponding to a light attenuation amount by using said optical filter, compared to when said at least one image sensor performs image capturing in which the plurality of stereopsis images are not output at the same exposure.

5. The apparatus according to claim 1, further comprising an optical member configured to split a light beam having passed through the aperture.

6. The apparatus according to claim 5, wherein said at least one image sensor is a single image sensor in which one pixel includes a plurality of light-receiving elements, and said optical member comprises a microlens arranged for the pixel including the plurality of light-receiving elements.

7. The apparatus according to claim 5, wherein said optical member comprises a mirror which splits a light beam having passed through the aperture into two light beams, and reflects the two split light beams in different directions.

8. The apparatus according to claim 7, wherein said at least one image sensor includes two image sensors,
   said two image sensors receive the two split light beams, respectively, and output the plurality of stereopsis images.

9. A method of controlling an image capturing apparatus including an image capturing unit configured to receive light beams split after passing through an aperture and output a plurality of stereopsis image data, comprising:
   when an object brightness falls within a predetermined range and the image capturing unit performs image capturing in which the plurality of stereopsis image data are output, controlling to open the aperture much more than when the image capturing unit performs image capturing in which the plurality of stereopsis image data are not output at the same exposure.

10. A non-transitory recording medium recording a program for causing a computer to perform the functions of the image capturing apparatus defined in claim 1.

* * * * *